United States Patent
Kawai et al.

[11] Patent Number: 5,811,025
[45] Date of Patent: Sep. 22, 1998

[54] CORROSION INHIBITING COOLANT COMPOSITIONS

[75] Inventors: Masaru Kawai; Yuji Miyake; Yasuaki Mori, all of Gifu, Japan

[73] Assignee: CCI Co., Ltd., Gifu, Japan

[21] Appl. No.: 541,806

[22] Filed: Oct. 10, 1995

[30] Foreign Application Priority Data

Oct. 13, 1994 [JP] Japan .................................. 6-247724

[51] Int. Cl.$^6$ .................................................. C09K 5/00
[52] U.S. Cl. .............................. 252/70; 252/76; 252/79; 252/75
[58] Field of Search .................. 252/76, 79, 75

[56] References Cited

U.S. PATENT DOCUMENTS

| | | | |
|---|---|---|---|
| 4,292,190 | 9/1981 | Davis et al. | 252/75 |
| 4,382,008 | 5/1983 | Boreland et al. | 252/75 |
| 4,450,088 | 5/1984 | Wilson et al. | 252/75 |
| 4,587,028 | 5/1986 | Darden | 252/76 |
| 4,851,145 | 7/1989 | Van Neste et al. | 252/75 |

*Primary Examiner*—Douglas J. McGinty
*Assistant Examiner*—Charles Boyer
*Attorney, Agent, or Firm*—James P. Hanrath

[57] ABSTRACT

Coolant compositions are disclosed which include only a minimum amount of metal corrosion inhibitor. The coolant compositions effectively inhibit: (1) metal corrosion; (2) precipitation of the included metal corrosion inhibitor; (3) oxidative deterioration of the included glycol; (4) lowering of the pH value of coolant fluid; and (5) chemical reaction with hard water components. A coolant composition of the invention includes an alkylbenzoic acid (or acids) or a salt (or salts) thereof, a hydrocarbon triazole and an alkali nitrate in addition to a glycol (or glycols) as a base, water and others. It is characteristic that the coolant compositions of the present invention do not include any aliphatic monobasic acids.

12 Claims, 1 Drawing Sheet

CORROSION INHIBITING COOLANT COMPOSITIONS

BACKGROUND OF THE INVENTION (1) Field of the Invention

This invention generally relates to coolant compositions to be mixed in the fluid or coolant in fluid heat exchange systems predominantly for, but not limited to, internal-combustion engines. More particularly, this invention relates to coolant inhibitor compositions including metal corrosion inhibitor.

(2) Description of Prior Art

Fluid or coolant used for fluid heat exchange systems for internal-combustion engines, such as automobile engines, often includes an amount of coolant composition to prevent freezing of the fluid in the winter time as well as to inhibit corrosion of the metals constituting the fluid heat exchange systems or cooling systems. Coolant inhibitor compositions to be mixed in coolant generally include a glycol or glycols and/or alcohol as a base to lower the freezing point of the coolant. Coolant inhibitor compositions generally also include metal corrosion inhibitor to slow or inhibit corrosion of the metals used in cooling systems such as aluminum and iron.

A fluid heat exchange system or cooling system for an internal-combustion engine such as an automobile engine is generally made of metals such as cast aluminum, cast iron, steel, brass, solder and copper. These metals are prone to corrosion due mainly to various metal ions produced in the cooling system during operation. Those metal ions accelerate oxidation of those metals. High temperature and high pressure in the cooling system also accelerate metal corrosion. Corrosion of such metals may lead to leakage of the fluid in the radiator pipes by creating tiny holes therein, as well as damage other metal portions of the cooling system such as jointing portions of parts, eventually overheating the engine or malfunctioning the engine system.

Japanese Patent Publication No. 4-42477 disclosed coolant compositions including metal corrosion inhibitor in addition to antifreeze. A coolant composition according to that invention disclosed therein comprises (a) an alkylbenzoic acid of the chemical structure,

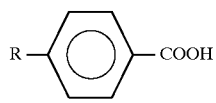

(wherein, R is an alkyl group of $C_1$–$C_5$), or an alkali, ammonium, or amine salt or salts thereof, (b) an aliphatic monobasic acid of $C_8$–$C_{12}$, or an alkali, ammonium, or amine salt or salts thereof, and (c) a hydrocarbon triazole. The aimed function of that coolant composition was to slow or inhibit metal corrosion while slowing deterioration of the included metal corrosion inhibitor.

That coolant composition disclosed in the publication set forth above includes a relatively large amount of metal corrosion inhibitor. The more metal corrosion inhibitor is included in a coolant composition, the more dissoluble the corrosion inhibitor becomes in cooling fluid due to the glycol also included in the coolant composition as a base. Glycol often vapors at the mechanical seal portions of the water pump of the cooling system, precipitating the metal corrosion inhibitor around the mechanical seal portions. Such precipitation of the metal corrosion inhibitor may result in malfunction of sealing in the mechanical seal portions, considerably damaging the function of the water pump. It is therefore desirable that the amount of corrosion inhibitor included in a coolant composition be as small as possible.

There is a conflict between the desired metal corrosion inhibition and avoidance of such precipitation. A coolant composition will not provide a desired metal corrosion inhibition if the amount of the metal corrosion inhibitor is not sufficient. Conventional coolant compositions on the market include about 4 wt % metal corrosion inhibitor, which can be regarded "too much" as far as the problem of precipitation of corrosion inhibitor in a cooling system is concerned.

The coolant compositions disclosed in Japanese Patent Publication No. 4-42477 set forth above are capable of delaying the progress of decomposition or deterioration of the included metal corrosion inhibitor to an extent, however, that invention did not aim at providing an efficient metal corrosion inhibition with a minimum amount of metal corrosion inhibitor to effectively avoid the problem of precipitation in a cooling system of the included metal corrosion inhibitor.

Further, it is desirable that the glycol in a coolant composition is stable over a long term of use. The glycol in a coolant composition should be very resistant to oxidative deterioration. The oxidation of the glycol of a coolant composition will lower the pH value of the coolant which includes the coolant composition, causing liquation of the metal portions of a cooling system. The coolant compositions disclosed in the foregoing publication include an aliphatic monobasic acid of $C_8$–$C_{12}$, therefore, susceptible to oxidative deterioration of the included glycol.

Still further, hard water components usually contained in coolant are apt to chemically react with coolant composition components and will form precipitates in the coolant, deteriorating the metal corrosion inhibiting function of the coolant, and may partially or totally close or clog the coolant circulation passages. It is therefore also desirable that a coolant composition be stable in coolant fluid which contains hard water.

Accordingly, it is an object of the present invention to provide a coolant inhibitor composition to be mixed in coolant for fluid heat exchange systems or cooling systems chiefly for internal-combustion engines, which includes only a minimum amount of metal corrosion inhibitor but is still capable of effectively inhibiting corrosion of metals, especially the aluminum and iron portions of cooling systems.

It is an additional object of the present invention to provide the coolant composition with an inhibitive function against oxidative deterioration of the included glycol and to keep stable the pH value of the coolant including the coolant composition for a long term of use.

It is still an additional object of the present invention to provide the coolant composition with stability against hard water components and avoid clogging of the passage pipes of cooling systems.

SUMMARY OF THE INVENTION

A coolant inhibitor composition of the present invention includes (a) an alkylbenzoic acid or acids of the chemical structure,

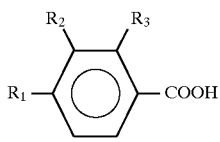

(wherein, one of $R_1$, $R_2$, and $R_3$ is an alkyl group of $C_1$–$C_4$, the remaining two are hydrogen atoms; $R_1$ is not a tert-butyl group), or an alkali metal, ammonium, or amine salt or salts thereof, (b) a hydrocarbon triazole, and (c) an alkali metal nitrate, as well as water and a glycol or glycols. It should be noted that the coolant compositions according to the present invention do not include any aliphatic monobasic acids.

The alkylbenzoic or acids used for the present invention may be p-toluic acid, p-ethyl benzoic acid, p-propyl benzoic acid, p-isopropyl benzoic acid or p-butyl benzoic acid. The alkylbenzoate may be an alkali metal salt, ammonium salt, or amine salt thereof. Among them, an alkali metal salt is preferred. Sodium benzoate or potassium benzoate is the most preferred benzoate. These alkyl benzoic acids or benzoates may be used singly or in combination. The hydrocarbon triazole may be benzotriazole or tolyltriazole, of which tolyltriazole is the more preferable. The alkali metal nitrate may be sodium nitrate or potassium nitrate.

The coolant composition of the present invention may also include an antifoaming agent and/or coloring agent. The coolant composition may also include other known anticorrosive agents such as a phosphate, amine salt, silicate, borate, nitrite, molybdate, tungstate, mercaptobenzothiazole or an alkali metal salt or salts thereof. The pH value of the coolant composition is preferably adjusted to 6.5–9.0, more preferably 7.0–8.0.

An alkylbenzoic acid (or acids) or benzoate (or benzoates) may preferably be included in the coolant composition between 0.5 wt % and 6.0 wt %. Hydrocarbon triazole may preferably be included between 0.05 wt % and 1.0 wt %. Alkali metal nitrate may preferably be included between 0.01 wt % and 1.0 wt %.

Less than 0.5 wt % alkylbenzoic acid or benzoate, less than 0.05 wt % hydrocarbon triazole, or less than 0.01 wt % alkali metal nitrate will not provide sufficient metal corrosion inhibition, while more than 6.0 wt % alkylbenzoic acid or benzoate, more than 1.0 wt % hydrocarbon triazole, or more than 1.0 wt % alkali metal nitrate will be a mere waste without any significant improvement in metal corrosion inhibition.

The coolant composition according to the present invention can provide a very effective metal corrosion inhibition, especially for aluminum and iron, with very small amounts of an alkylbenzoic acid or acids or their alkali metal salt or salts, a hydrocarbon triazole, and an alkali metal nitrate, which can also effectively prevent precipitation of those components in fluid heat exchange systems.

The included alkylbenzoic acid (or acids) or benzoate (or benzoates) excellently slows or inhibits corrosion of metals, especially aluminum and iron, and efficiently prevents precipitation otherwise causeable by chemical reaction with hard water in coolant. The hydrocarbon triazole also efficiently prevents corrosion of metals, especially copper and aluminum, while the alkali metal nitrate effectively prevents corrosion of metals, especially aluminum. The absence of aliphatic monobasic acids assists in inhibiting glycol oxidation as well as stabilization of the pH value of coolant.

BRIEF DESCRIPTION OF THE DRAWING TABLES

FIG. 1 is a schematic view of the leakage test system device used to study the effects of various coolant compositions prepared as embodiments, comparisons, and conventions.

Attached hereto are Table I through Table V which are hereby incorporated into this specification by this reference.

Table I shows the respective components of the coolant compositions prepared for the tests.

Table II shows the results of the metal corrosion testing.

Table III shows the results of the mechanical seal leakage testing.

Table IV shows the results of the glycol oxidative deterioration testing.

Table V shows the results of the hard water stability testing.

DETAILED DESCRIPTION OF THE EMBODIMENTS

Figure 1:
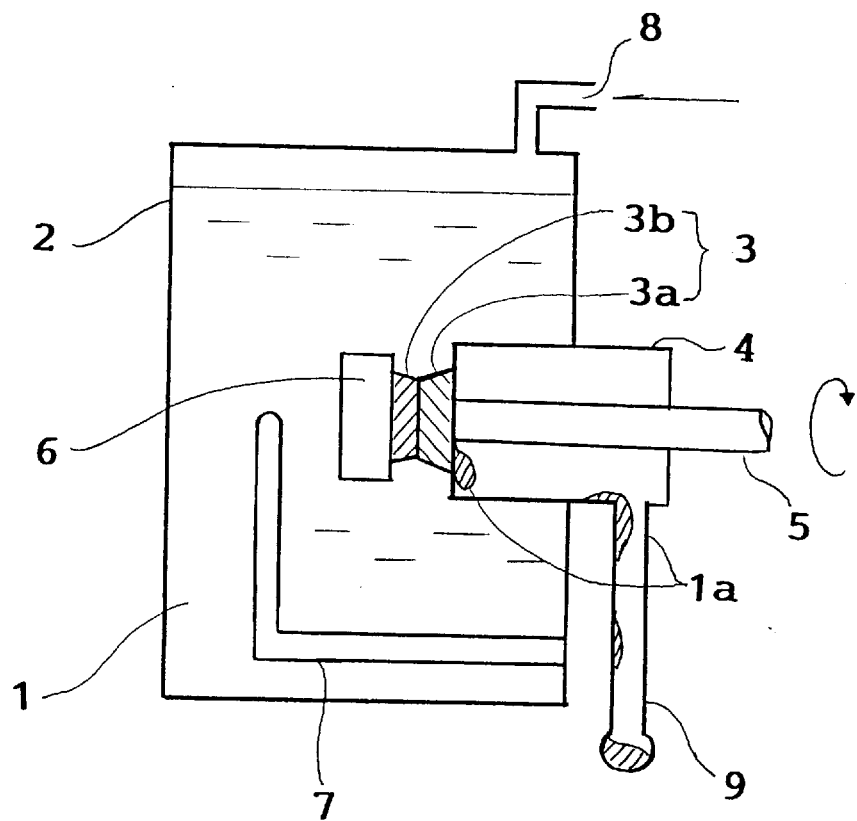

Tests were conducted to study the actual effects of coolant compositions of the present invention as compared with coolant compositions of different constitutions.

Table I shows the respective components of the coolant compositions prepared as Embodiments (coolant compositions according to the present invention), Conventions (conventional coolant compositions), and Comparisons (slightly modified versions of the coolant compositions of the present invention) to compare their respective inhibitive functions.

Test samples:

All the Embodiment coolant compositions included, in common, ethylene glycol as a base, 0.3 wt % tolyltriazole, 0.2 wt % sodium nitrate, and 2.0 wt % water (Common Components, hereinafter referred to as "CCS"). Each Embodiment also included sodium hydroxide and an alkylbenzoic acid (2.0 wt %) of the chemical structure (I),

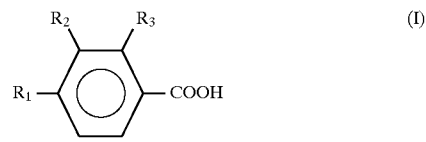

wherein, one of $R_1$, $R_2$, and $R_3$ is an alkyl group of $C_1$–$C_4$, and the others are hydrogen atoms.

EMBODIMENTS

Embodiment 1: CCS; 0.82 wt % sodium hydroxide; and 2.0 wt % toluic acid ($R_1$ is a methyl group) as an alkylbenzoic acid; pH 7.9

Embodiment 2: CCS; 0.75 wt % sodium hydroxide; and 2.0 wt % p-ethyl benzoic acid ($R_1$ is an ethyl group) as an alkylbenzoic acid; pH 7.9

Embodiment 3: CCS; 0.68 wt % sodium hydroxide; and 2.0 wt % p-propyl benzoic acid ($R_1$ is a propyl group) as an alkylbenzoic acid; pH 7.9

Embodiment 4: CCS; 0.68 wt % sodium hydroxide; and 2.0 wt % p-isopropyl benzoic acid ($R_1$ is an isopropyl group) as an alkylbenzoic acid; pH 7.8

Embodiment 5: CCS; 0.63 wt % sodium hydroxide; and 2.0 wt % p-butyl benzoic acid ($R_1$ is a butyl group) as an alkylbenzoic acid; pH 7.9

COMPARISONS

Comparison 1: CCS; and 3.0 wt. % sodium benzoate; pH 7.9

Comparison 2: CCS; and 3.5 wt % sodium benzoate; pH 7.8

Comparison 3: CCS; 0.77 wt % sodium hydroxide; and 2.5 wt % p-tert butyl benzoic acid; pH 7.9

Comparison 4: CCS; 0.94 wt % sodium hydroxide; and 3.0 wt % p-tert butyl benzoic acid; pH 8.0

Comparison 5: Embodiment 1 minus the tolyltriazole; pH 7.9

Comparison 6: Embodiment 1 minus the sodium nitrate; pH 7.9

Comparison 7: ethylene glycol as a base; 0.3 wt % tolyltriazole; 0.2 wt % sodium nitrate; 0.13 wt % sodium hydroxide; and 2.0 wt % water; pH 7.9

Comparison 8: ethylene glycol as a base; 0.3 wt % tolyltriazole; 0.2 wt % sodium nitrate; 2.47 wt % sodium hydroxide; 2.0 wt % water; and 6.0 wt % toluic acid as an alkylbenzoic acid; pH 7.9

CONVENTIONS

Convention 1: ethylene glycol as a base; 1.5 wt % p-tert butyl benzoic acid; 2.0 wt % 2-ethylhexanoic acid; 0.2 wt % tolyltriazole; 1.25 wt % sodium hydroxide; and 2.0 wt % water; pH 8.3

Convention 2: ethylene glycol as a base; 0.8 wt % sebacic acid; 1.7 wt % dodecandioic acid; 0.1 wt % tolyltriazole; 1.27 wt % sodium hydroxide; and 2.0 wt % water; pH 8.0

Tests:

Embodiments, Conventions and Comparisons were selectively tested for metal corrosion, leakage at mechanical seals, oxidation deterioration of each included ethylene glycol, and stability against hard water.

(1) Metal Corrosion Test

The metal corrosion test was carried out in accordance with "JIS K 2234-1987 Class 2," a Japanese standard for a metal corrosion test. Each tested coolant composition was deleted with preparation water to 30 vol % (coolant sample). Each sample coolant (750 ml) was put in a tall beaker. A test metal piece of a predetermined size was then placed in each beaker. Dry air was blown into each beaker at 100 ml/min. Each beaker was heated to 88° C. and left for 336 hours at that temperature. The weight of each test metal piece was measured before and after each test. The changes in weight were divided by the total surface area of the test pieces to obtain and compare corresponding metal corrosion degrees. The test pieces were prepared of cast aluminum, cast iron, steel, brass, solder and copper.

(2) Leakage Test

The leakage test was carried out using the leakage test device schematically shown in FIG. 1.

The test device includes a chamber 2 to be filled with tested coolant 1, and an experimental mechanical seal 3 housed in the chamber 2. The mechanical seal 3 consists of a seal ring 3a and a mating ring 3b. The seal ring 3a is attached to a cylindrical base 4, and the mating ring 3b is held by a disk 6. The mating ring 3b and the disk 6 are turned by a shaft 5 which extends through the cylindrical base 4, seal ring 3a, and mating ring 3b, and is fixed to the disk 6. The rings 3a and 3b are pressed against each other with a predetermined pressure so that coolant 1 will not enter the mechanical seal 3 at the beginning of the test. The mating ring 3b contacts the seal ring 3a and turns on the seal ring 3a.

The test device is also provided with a heater 7 to heat the coolant 1 to a predetermined temperature. The coolant 1 is pressed to a predetermined pressure level through an opening 8 provided on the top of the chamber 2.

As the test proceeds under an artificial use condition with the mating ring 3b turning on the seal ring 3a, the sample coolant 1 will gradually enter or leak into the mechanical seal 3 between the rings 3a and 3b. The leaked coolant 1a is collected in a pipe 9 through the inside of the cylindrical base 4. The amount of the collected coolant 1a is then measured.

Test Condition:

The concentration of each sample coolant 1 was 50 vol % (coolant composition to water 50:50). The coolant 1 was heated to 90° C. The revolution of the mating ring was 6,500 rpm. The pressure given through the opening 8 was 1.0 kg/cm$^2$. The test duration was 200 hours.

(3) Oxidative Deterioration Test

The test device was prepared according to "JIS K 2234 Antifreezing Liquid 7.4 Metal Corrosion," a Japanese standard for metal corrosion testing. Each tested sample coolant composition, 500 ml, was placed in a one-liter tall beaker. A copper plate having an area of 800 cm$^2$ was placed in each tall beaker. Dry air was blown into each beaker at 100 ml/min. Each sample coolant composition in the tall beaker was heated to 120° C. and kept at that temperature for 400 hours.

The pH values here were taken from the coolant compositions diluted to 30 wt % by water, kept at 100° C. for 5 hours, and then cooled. The precipitation caused by the oxidative deterioration of the ethylene glycol of each sample was measured as formic acid by ion chromatography.

(4) Stability in Hard Water

The test for studying stability in hard water was carried out as follows. Each test sample coolant composition was diluted to 50 vol % with hard water (total hardness 1,000 ppm; taken as $CaCO_3$) prepared of ion exchange water and $CaCl_2$ ($Ca^{2+}$,400 ppm). Each diluted liquid was left in the darkness for 24 hours at room temperature. The precipitation was measured in vol %.

Conclusion:

The results of these tests are shown in Tables II–V.

1—Metal Corrosion Test

The results of the metal corrosion test are shown in Table II. Conventions 1 and 2 were omitted from the metal corrosion test as they had proved to be insufficient for actual use in the previously conducted glycol oxidative deterioration test as their glycol oxidative deterioration inhibitive functions were judged "poor".

Table II shows that Embodiments were all sufficiently resistant against metal corrosion, satisfying the requirements of "JIS K 2234-1987 Class 2" standard. Embodiment coolants did not affect the appearance of the tested metal pieces. The appearance of the tested Embodiment coolants were not affected either by the metal corrosion test.

Comparisons 2, 3, 4 and 8 satisfied the requirements of the foregoing standard for all the tested metal pieces, while Comparisons 1, 5 and 6 did not. Comparison 7 without any alkylbenzoic acid corroded the metals considerably except brass and copper. The cast iron and steel pieces were locally corroded by Comparison 1 coolant composition. The cast aluminum pieces were locally corroded by Comparisons 3 and 6 coolant compositions. The brass and copper pieces were tarnished by Comparison 5 coolant composition.

2—Leakage Test

Table III shows the results of the leakage test. Embodiment 1 was selected as representative (2.0 wt % alkyl benzoic acid). Comparisons 2, 4, and 8 were selected where a relatively large amount of alkylbenzoic acid was included (3.5, 3.0, and 6.0 wt %, respectively). Conventions 1 and 2 were not tested again as their glycol oxidative deterioration inhibitive functions had been proved poor.

As Table III shows, the leakage (amount of 1a) by Embodiment 1 was 10 ml on the average while those by Comparisons 2, 4, and 8 were respectively 23 ml, 19 ml and 31 ml. From these results, it can be safely judged that the less the amount of alkylbenzoic acid in a coolant composition, the less such leakage occurs.

3—Oxidative Deterioration Test

Table IV shows the results of the glycol oxidative deterioration test.

Embodiment 1 was selected for the test from Embodiments 1–5 as representative where no aliphatic monobasic acid or aliphatic dibasic acid was included. Aliphatic monobasic acid and aliphatic dibasic acid were suspected to promote oxidative deterioration of glycols.

Convention 1 where aliphatic dibasic acid was included and Convention 2 where aliphatic monobasic acid was included were selected for comparison.

As Table IV shows, the change in pH value was small for Embodiment 1, while the changes in pH value for Conventions 1 and 2 were large. The amount of degradation product for Embodiment 1 was small, while those for Conventions 1 and 2 were large. From these results, it can be safely confirmed that aliphatic monobasic acid and aliphatic dibasic acid promote formation of degradation product by oxidatively deteriorating glycols.

4—Stability Test in Hard Water

Table V shows the results of the stability test against hard water. Embodiment 1 was selected for the test as representative where 2.0 wt % alkylbenzoic acid was included. Convention 1 where 1.5 wt % p-tert butyl benzoic acid was included and Convention 2 where no alkylbenzoic acid was included were also tested for comparison.

As Table V shows, Embodiment 1 and Convention 1 were stable in hard water, but Convention 2 was not. From the test, it can be concluded that an alkylbenzoic acid is capable to suppress formation of precipitate in hard water. Therefore, a coolant composition including an alkylbenzoic acid will make coolant stabler against hard water.

Coolant compositions according to the present invention may include, instead of ethylene glycol, propylene glycol, 1,3-butylene glycol, hexylene glycol, diethylene glycol, or glycerol glycol, or their selective combination. Coolant compositions of the present invention may also include an amount of sodium hydroxide to adjust the pH values.

While there has been shown and described what is at present considered the preferred embodiments of the present invention, it will be obvious to those skilled in the art that various changes and modifications may be made therein without departing from the scope of the invention as defined by the appended claims.

TABLE I

Components of Tested Coolant Compositions (Wt %)

| | Embodiment | | | | | Convention | | Comparison | | | | | | | |
|---|---|---|---|---|---|---|---|---|---|---|---|---|---|---|---|
| | 1 | 2 | 3 | 4 | 5 | 1 | 2 | 1 | 2 | 3 | 4 | 5 | 6 | 7 | 8 |
| Sebacic acid | | | | | | | 0.8 | | | | | | | | |
| Dodecandioic acid | | | | | | | 1.7 | | | | | | | | |
| 2-ethylhexanoic acid | | | | | | 2.0 | | | | | | | | | |
| P-tert butyl benzoic acid | | | | | | 1.5 | | | | 2.5 | 3.0 | | | | |
| Sodium benzoate | | | | | | | | 3.0 | 3.5 | | | | | | |
| Toluic acid | 2.0 | | | | | | | | | | | 2.0 | 2.0 | | 6.0 |
| P-ethyl benzoic acid | | 2.0 | | | | | | | | | | | | | |
| P-propyl benzoic acid | | | 2.0 | | | | | | | | | | | | |
| P-isopropyl benzoic acid | | | | 2.0 | | | | | | | | | | | |
| P-butyl benzoic acid | | | | | 2.0 | | | | | | | | | | |
| Tolyltriazole | 0.3 | 0.3 | 0.3 | 0.3 | 0.3 | 0.2 | 0.1 | 0.3 | 0.3 | 0.3 | 0.3 | | 0.3 | 0.3 | 0.3 |
| Sodium nitrate | 0.2 | 0.2 | 0.2 | 0.2 | 0.2 | | | 0.2 | 0.2 | 0.2 | 0.2 | 0.2 | | 0.2 | 0.2 |
| Sodium hydroxide | 0.82 | 0.75 | 0.68 | 0.68 | 0.63 | 1.25 | 1.27 | | | 0.77 | 0.94 | 0.82 | 0.82 | 0.13 | 2.47 |
| Water | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Ethylene glycol | 94.68 | 94.75 | 94.82 | 94.82 | 94.87 | 93.05 | 94.13 | 94.50 | 94.00 | 94.23 | 93.56 | 94.98 | 94.88 | 97.37 | 89.03 |
| pH (30 vol %) | 7.9 | 7.9 | 7.9 | 7.8 | 7.9 | 8.3 | 8.0 | 7.9 | 7.8 | 7.9 | 8.0 | 7.9 | 7.9 | 7.9 | 7.9 |

TABLE II

Metal Corrosion Test

| Change in Weight mg/cm$^2$ | JIS K 2234-1987 Class | Embodiment | | | | | Comparison | | | | | | | |
|---|---|---|---|---|---|---|---|---|---|---|---|---|---|---|
| | | 1 | 2 | 3 | 4 | 5 | 1 | 2 | 3 | 4 | 5 | 6 | 7 | 8 |
| Cast Aluminum | ±0.30 | −0.15 | −0.04 | −0.09 | −0.17 | −0.19 | −0.53 | −0.05 | −0.18 | −0.08 | −0.24 | −0.58 | −0.45 | −0.04 |
| Cast Iron | ±0.30 | 0.00 | +0.09 | +0.02 | +0.03 | +0.02 | −9.49 | +0.02 | −0.01 | −0.05 | +0.01 | −0.01 | −9.42 | −0.02 |
| Steel | ±0.15 | −0.03 | −0.02 | −0.04 | −0.06 | 0.00 | −0.58 | −0.06 | −0.02 | −0.03 | −0.04 | −0.05 | −5.32 | −0.04 |
| Brass | ±0.15 | −0.03 | −0.02 | −0.02 | −0.02 | −0.03 | −0.06 | −0.01 | −0.04 | −0.02 | −0.52 | −0.02 | −0.04 | −0.05 |
| Solder | ±0.30 | −0.03 | +0.05 | −0.08 | −0.03 | −0.05 | −0.17 | −0.08 | −0.04 | +0.01 | −0.15 | −0.07 | −1.30 | −0.10 |
| Copper | ±0.15 | −0.06 | −0.06 | −0.06 | −0.04 | −0.04 | −0.06 | −0.03 | −0.08 | −0.06 | −0.33 | −0.07 | −0.05 | −0.06 |
| pH (after testing) | 7.0 ~ 11.0 | 8.0 | 8.1 | 8.2 | 7.8 | 8.1 | 7.8 | 8.0 | 8.2 | 8.1 | 7.8 | 7.9 | 7.1 | 8.0 |

TABLE II-continued

Metal Corrosion Test

| Change in Weight mg/cm² | JIS K 2234-1987 Class 2 | Embodiment 1 | 2 | 3 | 4 | 5 | Comparison 1 | 2 | 3 | 4 | 5 | 6 | 7 | 8 |
|---|---|---|---|---|---|---|---|---|---|---|---|---|---|---|
| Appearance of Test Metals (after testing) | | no change | no change | no change | no change | no change | cast iron/steel locally corroded | no change | Cast aluminum locally corroded | no change | brass/copper tarnished | Cast aluminum locally corroded | cast aluminum/solder locally corroded Cast iron/steel generally corroded | no change |
| Appearance of Coolant (after testing) | | all normal | | | | | all normal | | | | | | | |

TABLE III

Leakage Test

| | | Embodiment 1 | Comparison 2 | 4 | 8 |
|---|---|---|---|---|---|
| Leakage ml | n1 | 11 | 19 | 15 | 34 |
| | n2 | 8 | 26 | 23 | 28 |
| | Average | 10 | 23 | 19 | 31 |

TABLE IV

Oxidative Deterioration Test

| | Embodiment 1 | Convention 1 | 2 |
|---|---|---|---|
| Change in pH | −1.3 | −2.4 | −3.3 |
| Degradation Product ppm | 2800 | 12500 | 17100 |

TABLE V

Stability Test in Hard Water

| | Embodiment 1 | Convention 1 | 2 |
|---|---|---|---|
| Precipitation vol % | 0.0 | 0.0 | 8.0 |

What is claimed is:

1. A coolant composition consisting essentially of:

a glycol or glycols as a base;

water;

about 0.5 to about 6.0 wt. % of an alkylbenzoic acid or acids, or an alkali metal, ammonium, or amine salt or salts thereof, of the chemical structure

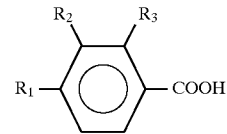

where one of $R_1$, $R_2$, and $R_3$ is an alkyl group of $C_1$–$C_4$ and the other two are hydrogen atoms, and $R_1$ is not a tert-butyl group;

about 0.05 to about 1.0 wt. % of a hydrocarbon triazole; and about 0.01 to about 1.0 wt. % of an alkali metal nitrate, further characterized in that no aliphatic monobasic acids or their salts are included.

2. The coolant composition of claim 1 wherein said alkylbenzoic acid or acids is one or more of p-toluic acid, p-ethyl benzoic acid, p-propyl benzoic acid, p-isopropyl benzoic acid, or p-butyl benzoic acid, or an alkali metal, ammonium, or amine salt or salts thereof.

3. The coolant composition of claim 1 wherein said salt or salts of said alkylbenzoic acid or acids is one or both of sodium or potassium.

4. The coolant composition of claim 1 wherein said hydrocarbon triazole is benzotriazole or tolyltriazole.

5. The coolant composition of claim 1 wherein said alkali metal nitrate is sodium nitrate or potassium nitrate.

6. The coolant composition of claim 1 further including an antifoaming agent.

7. The coolant composition of claim 1 further including a coloring agent.

8. The coolant composition of claim 1 further including an anticorrosive agent.

9. The coolant composition of claim 8 wherein said anticorrosive agent is one or more of a phosphate, amine salt, silicate, borate, nitrite, molybdate, tungstate, mercaptobenzothiazole, or an alkali metal salt or salts thereof.

10. The coolant composition of claim 1 having a ph value of about 6.5 to about 9.0.

11. The coolant composition of claim 1 further including an amount of sodium hydroxide to adjust its ph value.

12. The coolant composition of claim 1 wherein said glycol or gylcols is one or more of ethylene glycol, propylene glycol, 1,3-butylene glycol, hexylene glycol, diethylene glycol, or glycerol glycol.

* * * * *